US010185058B2

(12) United States Patent
Snyder et al.

(10) Patent No.: US 10,185,058 B2
(45) Date of Patent: Jan. 22, 2019

(54) PROTECTION FILM SUITABLE FOR ILLUMINATED DISPLAY DEVICES

(71) Applicant: 3M INNOVATIVE PROPERTIES COMPANY, St. Paul, MN (US)

(72) Inventors: Thomas M. Snyder, St. Paul, MN (US); Michelle L. Toy, North St. Paul, MN (US); Scott M. Tapio, Falcon Heights, MN (US); Audrey A. Sherman, Woodbury, MN (US); Joan M. Noyola, Maplewood, MN (US); Patrick E. Bisek, Rosemount, MN (US); John P. Baetzold, North St. Paul, MN (US); John J. Stradinger, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 47 days.

(21) Appl. No.: 14/787,619

(22) PCT Filed: Apr. 14, 2014

(86) PCT No.: PCT/US2014/033935
§ 371 (c)(1),
(2) Date: Oct. 28, 2015

(87) PCT Pub. No.: WO2015/002685
PCT Pub. Date: Jan. 8, 2015

(65) Prior Publication Data
US 2016/0103250 A1    Apr. 14, 2016

Related U.S. Application Data

(60) Provisional application No. 61/841,632, filed on Jul. 1, 2013.

(51) Int. Cl.
*G02B 1/14* (2015.01)
*G02F 1/1333* (2006.01)
(Continued)

(52) U.S. Cl.
CPC ............... *G02B 1/14* (2015.01); *B32B 1/00* (2013.01); *B32B 3/02* (2013.01); *C09J 7/20* (2018.01);
(Continued)

(58) Field of Classification Search
None
See application file for complete search history.

(56) References Cited

U.S. PATENT DOCUMENTS 2,736,721 A    2/1956    Dexter
3,437,622 A    4/1969    Dahl
(Continued)

FOREIGN PATENT DOCUMENTS

CN    1522024    8/2004
CN    201203726    3/2009
(Continued)

OTHER PUBLICATIONS

Moshi, "iVisor XT for iPad, Crystal Clear iPad Screen Protector," 3 pages.
(Continued)

*Primary Examiner* — Frank D Ducheneaux
(74) *Attorney, Agent, or Firm* — Michael Stern (57) ABSTRACT

The present invention relates to protection films comprising an optical film suitably sized for an illuminated display device, the optical film having perimeter surface portions defining a central region. The protection film further comprises a pressure sensitive adhesive layer at the perimeter surface portions of the optical film. The optical film and/or pressure sensitive adhesive layer has been adapted such that
(Continued)

the at least the central region of the optical film contacts the illuminated display device or the central region of the optical film is bonded to the illuminated display device by means of a self-wetting layer. The protection film may be preassembled or may be provided as a kit, the kit comprising an optical film and a double-faced pressure sensitive tape.

10 Claims, 4 Drawing Sheets

(51) Int. Cl.
| | |
|---|---|
| C09J 7/38 | (2018.01) |
| C09J 7/20 | (2018.01) |
| B32B 1/00 | (2006.01) |
| B32B 1/04 | (2006.01) |
| B32B 3/02 | (2006.01) |

(52) U.S. Cl.
CPC . *C09J 7/38* (2018.01); *B32B 1/04* (2013.01); *C09J 2201/28* (2013.01); *C09J 2201/606* (2013.01); *C09J 2203/318* (2013.01); *G02F 1/1333* (2013.01); *G02F 2201/50* (2013.01); *Y10T 428/24628* (2015.01); *Y10T 428/24777* (2015.01)

(56) References Cited

U.S. PATENT DOCUMENTS

| | | | |
|---|---|---|---|
| 3,718,712 A | 2/1973 | Tushaus | |
| 3,948,662 A | 4/1976 | Alston, Jr. | |
| 4,621,898 A | 11/1986 | Cohen | |
| 4,907,090 A | 3/1990 | Ananian | |
| 5,132,588 A | 7/1992 | Warman | |
| 5,204,160 A | 4/1993 | Rouser | |
| 5,214,119 A | 5/1993 | Leir | |
| 5,486,883 A | 1/1996 | Candido | |
| 5,591,820 A | 1/1997 | Kydonieus | |
| 5,668,612 A | 9/1997 | Hung | |
| 5,677,050 A | 10/1997 | Bilkadi | |
| 5,820,957 A | 10/1998 | Schroeder | |
| 6,250,765 B1 | 6/2001 | Murkami | |
| 6,299,799 B1 | 10/2001 | Craig | |
| 6,315,651 B1 | 11/2001 | Kuo | |
| 6,376,590 B2 | 4/2002 | Kolb | |
| 6,398,370 B1 | 6/2002 | Chiu | |
| 6,469,752 B1 | 10/2002 | Ishikawa | |
| 6,536,589 B2 | 3/2003 | Chang | |
| 6,555,235 B1 | 4/2003 | Aufderheide | |
| 6,559,902 B1 | 5/2003 | Kusuda | |
| 6,592,950 B1 | 7/2003 | Toshima | |
| 6,614,423 B1 | 9/2003 | Wong | |
| 6,667,738 B2 | 12/2003 | Murphy | |
| 6,721,019 B2 | 4/2004 | Kono | |
| 6,750,922 B1 | 6/2004 | Benning | |
| 6,777,055 B2 | 8/2004 | Janssen | |
| 6,778,240 B2 | 8/2004 | Nakamura | |
| 6,800,378 B2 | 10/2004 | Hawa | |
| 6,864,882 B2 | 3/2005 | Newton | |
| 6,879,319 B2 | 4/2005 | Cok | |
| 6,995,976 B2 | 2/2006 | Richardson | |
| 7,034,877 B2 | 4/2006 | Schmidt | |
| 7,070,837 B2 | 7/2006 | Ross | |
| 7,226,176 B1 | 6/2007 | Huang | |
| 7,241,437 B2 | 7/2007 | Davidson | |
| 7,255,920 B2 | 8/2007 | Everaerts | |
| 7,371,464 B2 | 5/2008 | Sherman | |
| 7,495,895 B2 | 2/2009 | Carnevali | |
| 7,705,103 B2 | 4/2010 | Sherman | |
| 7,961,281 B2 | 6/2011 | Tsuji et al. | |
| 8,012,567 B2 | 9/2011 | Gaides | |
| 8,044,942 B1 | 10/2011 | Leonhard | |
| 2002/0101411 A1 | 8/2002 | Chang | |
| 2002/0122925 A1 | 9/2002 | Liu | |
| 2002/0154099 A1 | 10/2002 | Oh | |
| 2002/0195910 A1 | 12/2002 | Hus | |
| 2003/0012936 A1 | 1/2003 | Draheim | |
| 2003/0087054 A1 | 5/2003 | Janssen | |
| 2003/0110613 A1 | 6/2003 | Ross | |
| 2004/0004605 A1 | 1/2004 | David | |
| 2004/0109096 A1 | 6/2004 | Anderson | |
| 2004/0227722 A1 | 11/2004 | Friberg | |
| 2004/0246386 A1 | 12/2004 | Thomas | |
| 2005/0146881 A1 | 7/2005 | Freking | |
| 2006/0114245 A1 | 6/2006 | Masters | |
| 2007/0181456 A1 | 8/2007 | Kusuda | |
| 2007/0211002 A1* | 9/2007 | Zehner | G02F 1/1339 345/84 |
| 2007/0212535 A1 | 9/2007 | Sherman | |
| 2007/0286994 A1 | 12/2007 | Walker | |
| 2008/0030631 A1 | 2/2008 | Gallagher | |
| 2008/0055258 A1 | 3/2008 | Sauers | |
| 2008/0062147 A1 | 3/2008 | Hotelling | |
| 2008/0131634 A1* | 6/2008 | Kiuchi | B32B 1/08 428/34.9 |
| 2008/0302456 A1 | 12/2008 | Cook | |
| 2010/0026646 A1 | 2/2010 | Xiao | |
| 2010/0092713 A1 | 4/2010 | Bullard | |
| 2010/0102197 A1 | 4/2010 | McIntyre | |
| 2010/0164836 A1 | 7/2010 | Liberatore | |
| 2010/0201242 A1 | 8/2010 | Liu | |
| 2010/0208352 A1 | 8/2010 | Onozawa | |
| 2010/0214506 A1 | 8/2010 | Gaides | |
| 2010/0232021 A1 | 9/2010 | Walker, Jr. | |
| 2010/0238119 A1 | 9/2010 | Dubrovsky | |
| 2010/0245273 A1 | 9/2010 | Hwang | |
| 2010/0270189 A1 | 10/2010 | Padersen, II | |
| 2011/0123800 A1 | 5/2011 | Sherman | |
| 2011/0157056 A1 | 6/2011 | Karpfinger | |
| 2011/0195248 A1* | 8/2011 | Kiuchi | B32B 7/12 428/339 |
| 2011/0279383 A1 | 11/2011 | Wilson | |
| 2011/0285932 A1 | 11/2011 | Park | |
| 2011/0316203 A1 | 12/2011 | Emslander | |
| 2012/0100326 A1 | 4/2012 | Sherman | |
| 2012/0154811 A1 | 6/2012 | Pokorny | |
| 2012/0183712 A1 | 7/2012 | Leonhard | |
| 2012/0183713 A1 | 7/2012 | Leonhard | |
| 2012/0188743 A1* | 7/2012 | Wilson | G06F 3/041 361/816 |
| 2012/0270980 A1 | 10/2012 | Pokorny | |
| 2013/0209752 A1* | 8/2013 | Wilson | G06F 3/041 428/188 |
| 2013/0316112 A1* | 11/2013 | Leonhard | B32B 3/10 428/38 |
| 2014/0072749 A1* | 3/2014 | Leonhard | G06F 1/1637 428/41.7 |

FOREIGN PATENT DOCUMENTS

| | | |
|---|---|---|
| CN | 201397689 | 2/2010 |
| DE | 19808535 | 9/1999 |
| EP | 1471415 | 10/2004 |
| EP | 1548691 | 6/2005 |
| GB | 2449899 | 12/2008 |
| JP | 2002-328613 | 11/2002 |
| KR | 10-2004-0011013 | 2/2004 |
| KR | 20-2009-0010007 | 1/2009 |
| KR | 10-2012-0078135 | 7/2012 |
| KR | 10-2012-0106068 | 9/2012 |
| TW | 200700793 | 1/2007 |
| TW | M343359 | 10/2008 |
| TW | 201027992 | 7/2010 |
| TW | M386524 | 8/2010 |
| TW | M400596 | 3/2011 |
| WO | 1997-33946 | 9/1997 |
| WO | 2000-75210 | 12/2000 |
| WO | 2003-052678 | 6/2003 |
| WO | 2006-102383 | 9/2006 |
| WO | 2009-085662 | 7/2009 |
| WO | 2010-141345 | 12/2010 |
| WO | 2010-148082 | 12/2010 |

(56) References Cited

FOREIGN PATENT DOCUMENTS

| WO | 2011-140018 | 11/2011 |
| WO | 2013-106241 | 7/2013 |
| WO | 2014-197368 | 12/2014 |

OTHER PUBLICATIONS

"3M™ Optically Clear Adhesives 8171CL•8172CL," Technical Data, Feb. 2010, 4 pgs.
International Search Report for PCT International Application No. PCT/US2014/033935, dated Aug. 11, 2014, 4pgs.

* cited by examiner

PROTECTION FILM SUITABLE FOR ILLUMINATED DISPLAY DEVICES

SUMMARY

The present invention relates to protection films comprising an optical film suitably sized for an illuminated display device, the optical film having a major surface comprising perimeter surface portions defining a central region. The protection film further comprises a pressure sensitive adhesive layer disposed at the perimeter surface portions of the optical film. The optical film and/or pressure sensitive adhesive layer has been adapted such that the at least the central region of the optical film contacts the illuminated display device or the central region of the optical film is bonded to the illuminated display device by means of a self-wetting layer.

In some embodiments, the central region is free of pressure sensitive adhesive. In one embodiment, the protection film is curved. In typical embodiments, opposing edges, defining the thickness of the protection film, are spaced from a reference plane that is parallel to the major surface of the optical film by a distance of at least 1 mm. In another embodiment, the thickness of the pressure sensitive adhesive layer between the optical film and opposing outer surface of the pressure sensitive adhesive layer is no greater than 50 microns.

In yet another embodiment, a self-wetting layer is disposed upon the central region. The self-wetting layer has a lower average peel force than the perimeter pressure sensitive adhesive layer.

In yet other embodiments, protection film kits are described comprising an optical film suitably sized for an illuminated display device and a double-faced tape (e.g. strip(s) or sheet) comprising a pressure sensitive adhesive layer. The optical film and or double-faced tape has been adapted such that when the protection film kit is assembled and bonded to an illuminated display device, the optical film contacts the viewing surface of the display device at the central region or is bonded to the viewing surface of the display device by means of a self-wetting layer.

DETAILED DESCRIPTION

Figure 1:
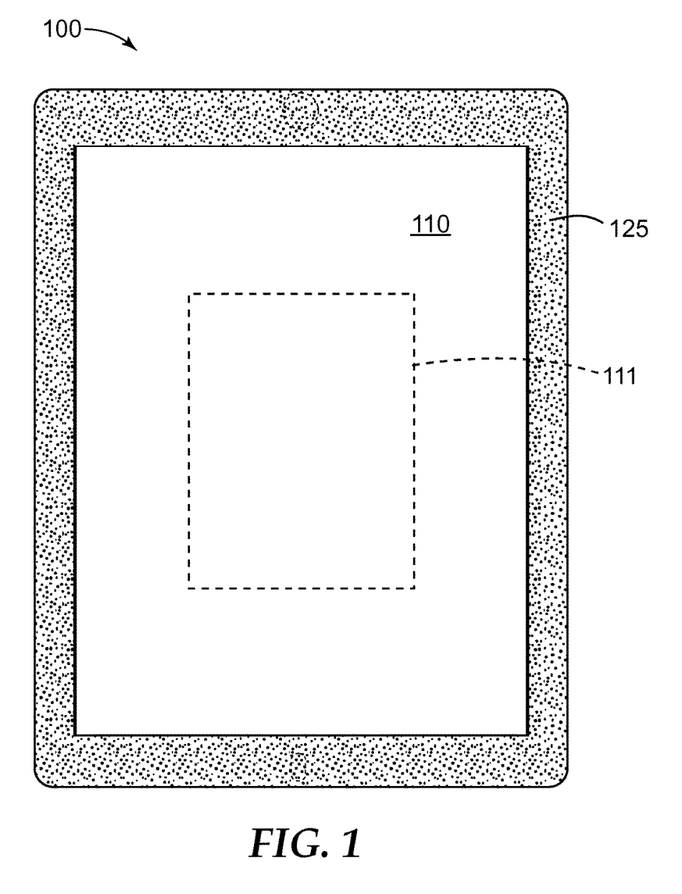
FIG. 1 is a back planar view of an illustrative protection film comprising a pressure sensitive adhesive layer at perimeter surface portions of the optical film.

Presently described are protection films (also referred to as screen protectors) suitable for electronic illuminated display devices such as phones and tablet computers. With reference to FIG. 1 protection film 100 generally comprises an optical film 110 and a pressure sensitive adhesive layer 125 disposed upon a major surface of the optical film at perimeter surface portions of the optical film.

In some embodiments, the protection film has been adapted such that at least the central region of the optical film contacts viewing surface of the illuminated display device when the optical film is bonded to the illuminated display device by mean of the perimeter pressure sensitive adhesive layer. In this embodiment, the optical film 110 is free of pressure sensitive adhesive at the central region 111 of the optical film, as depicted in FIG. 1.

The central region 111 is generally defined by a surface area of at least 50% of the surface that is bordered by the perimeter adhesive layer and includes the center point of the optical film. In some embodiments, the central region has a surface area of at least 60%, 70%, 80%, or 90% of the surface area bordered by the perimeter adhesive layer.

In other embodiments, the protection film comprises a self-wetting layer at the central region of the optical film, such self-wetting layer having a lower peel force to the viewing surface of the (e.g. glass) display than the perimeter adhesive layer. In this embodiment, the self-wetting layer is typically disposed such that it forms a continuous layer on the entire viewing surface of the display bordered by the perimeter pressure sensitive adhesive layer when the protection film is bonded to the illuminated display device.

For both embodiments, the protection film is advantageously easier to apply without incorporating air bubbles, particularly at the central (i.e. viewing) region. Protection films commonly utilize a high peel force full face adhesive, meaning that the adhesive layer covers the entire surface are of the protection film. Bubble free application and alignment are two major challenges of applying a protection film with a full face adhesive. A film with a perimeter adhesive is easier to apply given that the center portion of the film is not adhered to the display at the central region. This provides a bubble free portion in the center of the film that typically coincides with the viewable area of the device. Bubble free application can also be accomplished when a (e.g. microstructured) self-wetting layer is used at the central region rather than the same high peel force adhesive as utilized for the perimeter.

Full face adhesive screen protectors are typically a single use product. Once the screen protector is removed from the device, the screen protector is thrown away unless extreme caution is used not to collect dirt and debris. The perimeter adhesive allows for numerous applications and removals to the device with the same protection film. This allows for an easy and quick correction when the protection film is misaligned. This is also advantageous for privacy film where the user may want the functionality of the film in certain environments (e.g. public transit, airport, etc) and not in others (e.g. at home, sharing content at work, etc). An antiglare film is another example of this where the user may want antiglare functionality in certain environments (e.g. outdoors, bright indoor light, etc) but not in others (e.g. low light conditions, etc). By having an attachment system that allows for removal and reapplication, the device user can choose when they want to utilize the protection film without having to replace the protection film after each removal.

Direct contact or indirect (by means of the self-wetting layer) contact between the central region of the protection film and the display device surface can also advantageous for touch sensitivity, optics and tactile quality. An air gap between the screen protector and device can also prevent a touch screen device from registering very light touches or swipes. Thus, such air gap can impair the touch sensitivity functionality. An air gap between the protection film and a display device also increases the blurring effect of a hazy film; more specifically, it can blur the (e.g. illuminated) image. Reducing or eliminating the air gap minimizes such optical degradation. An air gap between the protection film and device can also create an undesirable spongy or soft feeling to the user when operating a touch screen. It is desirable to have a solid feel, similar to that of the bare device (i.e. without a protection film). When the optical film of the protection film contacts the display, the tactile quality is substantially the same when the protection film is present as compared to the same (e.g. touch screen) device in the absence of the protection film.

The optical films of the protection films described herein are suitably sized and shaped closely to the dimensions of the illuminated electronic display device it is intended for. Although the protection films are not limited in shape, since commercially available devices are generally rectangular in shape, the illustrative protection films depicted herein are generally rectangular in shape as well.

In favored embodiments, the protection films are suitable for a more recent electronic illuminated display device, commonly referred to as a "tablet". However, such protection films can be adapted in size and shape to be suitable for any illuminated display devices. As used herein, tablet refers to an electronic display device that does not hinge open and closed (such as in the case of a flip phone, laptop computer, or the like). In some embodiments, the tablet may primarily be a display device (such as an electronic reader). Other tablet electronic devices, such as computers, typically have touch-sensitive keyboard functionality integrated into the display. Thus, the display and keyboard components are one in the same, rather than separate components. In other words, a tablet computer can be considered to lack a keyboard component that is a separate component than the display.

A protection film for hand-held electronic illuminated display device typically has a diagonal ranging from 3 to 5 inches. Tablet computers are generally larger in size than a hand-held device. In some embodiments, the protection film suitable for a tablet has a diagonal of greater than 5 or 6 inches. For example, the protection film may have a diagonal of at least 7, 8, 9, or 10 inches and typically no greater than 15 or 20 inches.

The thickness of the optical film or an optical film stack is typically at least 1 mil (25 microns) and no greater than 20, 15 or 10 mils. In favored embodiments, the protection films are suitable for (e.g. hand-held and tablet) electronic illuminated display devices that are touch-sensitive. In this embodiment, the optical films are preferably of a sufficiently low thickness as to not detract from the touch-sensitivity. In some embodiments, the thickness of the optical film or an optical film stack is no greater than 0.025 inches, or 0.020 inches, or 0.010 inches (e.g. 0.0085 inches).

In some embodiments, the protection film has been adapted such that at least the central region of the optical film contacts the illuminated display device when the optical film is bonded to the illuminated display device by mean of the perimeter pressure sensitive adhesive layer. In favored embodiments, this is accomplished with a curved protection film and/or a perimeter pressure sensitive adhesive layer having a minimal thickness.

Figure 2:
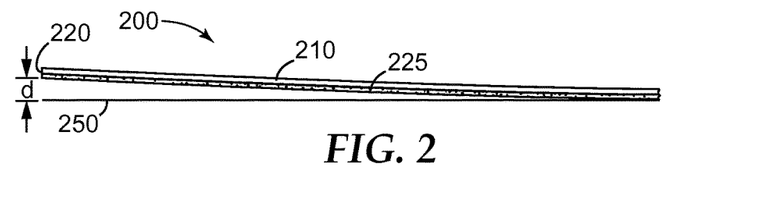
FIG. 2 is a side view of another embodied protection film wherein the protection film is curved.

In one embodiment, the protection film is curved. With reference to FIG. 2, a side-view of an exemplary protection film 200, comprising optical film 210 and pressure sensitive adhesive layer 225. The protection film generally curves in a direction such that the central region 111 of the optical film curves towards and lies in contact with the illuminate display device, represented by reference plane 250. The curvature of the protection film is sufficient such that opposing edges 220 of the protection film (i.e. including the pressure sensitive adhesive layer), that define the thickness of the protection film (along the z-axis) and nearest to reference plane 250 are deflected from the reference plane by a distance "d" of at least 1 mm. In some embodiments, the deflection ("d") is at least 2, 3, 4, or 5 mm. In some embodiments, the maximum deflection is typically no greater than about 10% of the length of the side of the protection film. Thus, in the case of a hand-held (e.g. "Smart") phone device, the maximum deflection is typically no greater than about 12 mm. However, in the case of a tablet computer device, the maximum deflection is typically no greater than about 20 mm. Although the deflection can be even higher for the technical effect of facilitating contact between the central region of the optical film and the major viewing surface of the illuminated display device, application of the protection film to the illuminated display device can be increasingly difficult when the protection film is excessively curved. For this reason, the deflection is typically minimized and no greater than about 10 mm particularly for protection films for tablets and hand-held devices.

In some embodiments, the opposing edges are parallel to the longest (i.e. length) dimension of the major surface of the protection film (e.g. y-axis). In other embodiments, the opposing edges are parallel to the shortest (i.e. width) dimension of the major surface of the protection film (e.g. x-axis). In yet other embodiments, the protection film is curved about both the x- and y-axis of the protection. When the protection film is rectangular, the outermost edge of each corner is typically spaced from the reference plane by a distance of at least 1 mm.

The protection film is curved at the time the protection film is applied to the illuminated display device by means of the perimeter pressure sensitive adhesive layer. In some embodiments, the protection film is curved "as packaged" or "as received". In this embodiment, the protection film is curved prior to application. In other embodiments, the protection film is not curved "as packaged" or "as received". For example, in some embodiments, the protection film further comprises a release liner (not shown) disposed on the exposed surface of the pressure sensitive adhesive layer 125. The stiffness of the release liner prevents curvature until the release liner is removed. However, the protection film curves upon removal of the release liner. The protection film is also curved during use of the illuminated display device after the protection film has been applied.

There are various ways to induce curvature to the protection film including utilizing an optical film having a tension differential between at least two layers; utilizing an optical film comprising a heat shrinkable film; utilizing an optical film comprising a coating composition having sufficient shrinkage to induce curvature; providing the protection film in a form such that it is rolled upon itself forming a hollow tube; and combinations thereof.

In one embodiment, the protection film, optical film, or a film used as a component of the optical film has a tension differential between at least two (e.g. adjacent) layers to induce curvature. For example, as illustrated by forthcoming Example 1, during the manufacture of a (e.g. privacy) light-collimating optical film if either the microstructured film or the coversheet film is conveyed such that at least one of these films is subjected to a higher tension than the other, the subsequent relaxation of the laminated films results in a curved optical film. The tension differential can vary depending on the internal strength of the film and the desired amount of curvature. In general the tension differential typically ranges from about 10 to 150 psi and in some embodiments, the tension differential is no greater than 100, or 90, or 80, or 70, or 60, or 50 psi.

In yet another embodiment, the optical film or a film used as a component of the optical film can be subjected to incomplete heat set to induce curvature. For example, the production procedure of polyester film typically starts with molten polyethylene terephthalate that is extruded on top of a chill roll. In turn, this roll presses it until it reaches an amorphous state. Drawing is used to give the film a biaxial orientation. After drawing, the film is subjected to crystallization or "heat set." That is, the film is put under tension and placed inside the oven. The ideal oven temperature is typically greater than 200° C. Heat setting is important in the production of polyester film because it prevents the film from going back or shrinking to its initial untensioned shape. Heat setting also helps secure the molecular orientation and responsible for the clear nature of the film although it has a semi-crystalline structure. Thus, incomplete heat setting can be utilized to manufacture heat shrinkable (e.g. polyester) films.

In yet another embodiment, the optical film comprises a coating composition on at least a portion of at least one major surface of the protection film, optical film, or a film used as a component of the optical film. The coating composition has sufficient shrinkage to induce curvature to the protection film.

Various water-based, solvent-based, and polymerizable resin coating compositions are known to shrink upon evaporation of the (aqueous and/or organic) solvent and/or upon curing. The thickness of the coating can vary. In some embodiments, the thickness of the (e.g. dried and cured) coated surface layer is typically at least 0.5 microns, preferably at least 5 micron, and more preferably at least 10 microns. The thickness of the coated layer is generally no greater than 50, 40, or 30 microns. In some embodiments, the thickness ranges from 5 microns to 20 microns.

In some embodiments, the coating that induces curvature forms the exposed outer surface of the protection film. In other embodiments, the coating that induces the curvature is provided at the opposing surface (i.e. the surface that faces the display device). In another embodiment, a coating is provided on both major surfaces of the optical film. In this embodiment, the second coating composition typically exhibits a lower shrinkage than the coating composition of the exposed outer surface to reduce the curvature.

The coating that induces curvature typically has at least one other technical effect in addition to inducing curve. For example, the coating may be an abrasion resistant hardcoat or a soil resistant low surface energy coating. In another embodiment, the coating may be an antiglare or matte coating that reduces the gloss and provides a slight haze to the protection film. In yet other embodiments, the coating may be an antireflection coating or a coating that reduces the visibility of fingerprints.

In some embodiments, the coating composition is a curable coating composition comprising one or more ethylenically unsaturated monomer or oligomers, also referred to as "binder precursors" since such components form a cross-linked polymeric binder upon curing.

Di(meth)acryl binder precursors include for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate.

Tri(meth)acryl binder precursor include for example glycerol triacrylate, trimethylolpropane triacrylate, ethoxylated trimethylolpropane triacrylates (e.g. having 3 to 20 ethoxylate repeat), propoxylated glyceral triacrylates, trimethylolpropane triacrylate, tris(2-hydroxyethyl)isocyanurate triacrylate. Higher functionality (meth)acryl containing compounds include for example ditrimethylolpropane tetraacrylate, dipentaerythritol pentaacrylate, ethoxylated pentaerythritol tetraacrylate, caprolactone modified dipentaerythritol hexaacrylate.

One commercially available form of pentaerythritol triacrylate ("PET3A") is SR444C and one commercially available form of pentaerythritol tetraacrylate ("PET4A") is SR295, each available from Sartomer Company of Exton, Pa.

Oligomeric (meth)acryl binder precursors such as urethane acrylates, polyester acrylates, epoxy acrylates; and polyacrylamide analogues of the foregoing can also be employed as the binder.

Typically, as the number of (meth)acrylate groups per molecular weight of the binder precursor decreases, the shrinkage increases. For example, in some embodiments the coating composition comprises at least 40, 45, 50 or 55 wt-% solids of monomeric tri(meth)acryl binder precursors, such as PET3A and or PET4A. Although the concentration of monomeric tri(meth)acryl binder precursors can range up to 100% of the organic portion of the polymerizable coating composition, in some embodiments the concentration of monomeric tri(meth)acryl binder precursors is no greater than 90, 85, 80, or 75 wt-%.

In one embodiment, the binder may comprise one or more N,N-disubstituted acrylamide and or N-substituted-N-vinylamide monomers as described in U.S. Pat. No. 5,677,050 (Bilkadi et al.) and U.S. Pat. No. 6,299,799 (Craig et al.). The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

To facilitate curing, the polymerizable coating compositions may further comprise at least one free-radical thermal initiator and/or photoinitiator. Typically, such an initiator and/or photoinitiator are present in an amount less than about 10 percent by weight, more typically less than about 5 percent of the polymerizable composition, based on the total weight of the polymerizable composition.

In some embodiments, the polymerizable coating composition contains surface modified inorganic particles that add mechanical strength and durability to the resultant coating or for the purpose of adjusting the refractive index of the coating.

A variety of inorganic oxide particles can be used in the hardcoat. The inorganic oxide particles can comprise or consist essentially of or consist of a single oxide such as silica, or can comprise a combination of oxides, such as silica and aluminum oxide, or a core of an oxide of one type (or a core of a material other than a metal oxide) on which is deposited an oxide of another type.

In some embodiments the polymerizable coating composition comprises high refractive index particles. Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. Nos. 7,241,437 and 6,376,590. Polymerizable coating compositions comprising high refractive index particles are useful for preparing coating compositions that are index matched to a high refractive index optical substrate such as polycarbonate or polyester. Polymerizable coating compositions comprising high refractive index particles are also useful for the high refractive index layer of an antireflective coating.

The inorganic oxide particles are typically non-aggregated (substantially discrete), as aggregation can result in optical scattering (haze) or precipitation of the inorganic oxide particles or gelation. The inorganic oxide particles are typically colloidal in size, having an average primary particle diameter of 5 nanometers to 100 nanometers. The particle size of the inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The inorganic nanoparticles are preferably treated with a surface treatment agent. In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing as is known in the art.

In some embodiments, the coating composition comprises an additive comprising a low surface energy group, such as a silicone or fluorinated. Such additives are useful for soil resistant coatings, such as described in WO2006/102383, and coatings that reduce the visibility of fingerprints, such as described in US2012/0270980, incorporated herein by reference. Coatings that reduce the visibility of fingerprints further comprise a 10 wt-% to 25 wt-% solids of a non-ionic (unpolymerizable and/or polymerizable) surfactant having a hydrophilic lipophilic balance ranging from 2 to 6.

Figure 3:
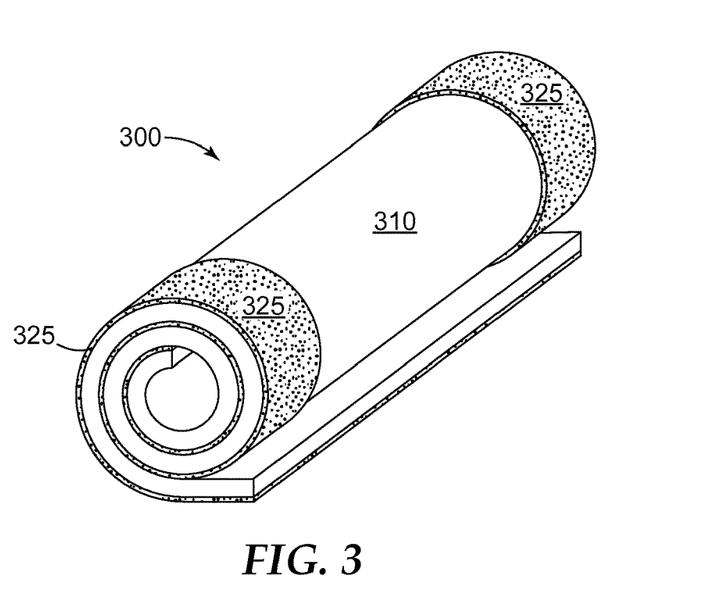
FIG. 3 is a perspective view of another embodied protection film rolled upon itself forming a hollow tube.

In another embodiment illustrated in FIG. 3, protection film 300, comprising optical film 310 and perimeter pressure sensitive adhesive layer 325 is provided in a form wherein the protection film is rolled upon itself forming a hollow tube to induce curvature. When the major surface of the optical film comprises a low surface energy coating, such surface coating may also function as a release liner. Thus, the protection film may lack a conventional release liner disposed on the opposing surface of the pressure sensitive adhesive layer. However, for other embodiments, a release liner (not shown) is disposed upon exposed pressure sensitive adhesive layer prior to the protection film being rolled up.

The protection films comprising a thin pressure sensitive adhesive and/or further comprising a self-wetting layer can also be rolled upon itself forming a hollow tube to induce curvature. Further, a protection film kit can be provided wherein the optical film is rolled upon itself forming a hollow tube to induce curvature.

The hollow tube form can be retained by any means such as a piece of removable tape, a rubber band, or the package of the protection film. For example, rather than packaging the protection film such that it lies flat within a cardboard envelope, the tube-shaped protection film may be packaged in a tube shaped package or a rectangular box where the package prevents the protection film from unrolling. It is appreciated that films that are stored in a rolled configuration typically retain curvature when unrolled. In this embodiment, the curvature of the protection film may be temporary, yet evident when the protection film is applied to the illuminated display device by means of the pressure sensitive adhesive layer.

Inducing curvature is one approach to adapting the protection film to facilitate contact of the optical film with the illuminated display device when the optical film is bonded to the illuminated display device by means of the perimeter pressure sensitive adhesive layer.

Figure 4:
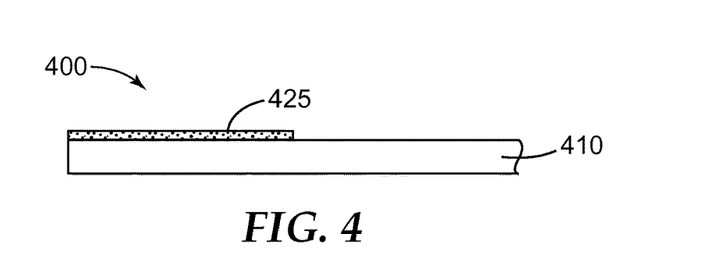
FIG. 4 is a schematic cross-sectional view of another embodied protection film comprising a thin pressure sensitive adhesive layer at perimeter surface portions of the optical film.

Alternatively or in combination thereof, the perimeter pressure sensitive adhesive layer may be adapted to facilitate contact of the optical film with the illuminated display device. In one embodiment, this can be accomplished by utilizing a pressure sensitive adhesive layer of minimal thickness. For example, with reference to FIG. 4, a cross-sectional view of an exemplary protection film 400, comprising optical film 410 and pressure sensitive adhesive layer 425 disposed at perimeter surface portions of the optical film 410, the pressure sensitive adhesive layer has a thickness ("t") of no greater than 50 microns. In some embodiments, the thickness is no greater than 45, or 40, or 35, or 30, or 25 microns. The thickness is typically at least 5 or 10 microns. In this embodiment, the pressure sensitive adhesive layer typically lacks a substrate (such as a tape backing) between the optical film and opposing outer surface of the pressure sensitive adhesive layer.

The protection film described herein comprises a pressure sensitive adhesive layer disposed at perimeter surface portions of the optical film. In some embodiments, the perimeter pressure sensitive adhesive layer is the sole adhesive of the protection film. The perimeter pressure sensitive adhesive layer can be an aggressive pressure sensitive adhesive having a high peel force to the (e.g. glass) display. For example, the perimeter pressure sensitive adhesive layer may have a 180 degree peel force to the (e.g. glass) display at a rate of 12 inches/minute as high as 500 g/inch, 1000 g/inch or 1500 g/in. However, a 180 degree peel force to the (e.g. glass) display of 100 g/inch, 150 g/inch or 200 g/inch at a rate of 12 inches/minute is generally adequate to retain the protection film in place during use of the display.

In some embodiments, the pressure sensitive adhesive layer disposed at perimeter surface portions of the optical film is colored (e.g. black), the color of the adhesive creating a colored frame. In other embodiments, the pressure sensitive adhesive layer disposed at perimeter surface portions of the optical film is optically clear and a frame may be created by printing a (e.g. decorative) frame on the optical film prior to disposing the pressure sensitive adhesive layer at the perimeter. Thus, the printed frame is present between the optical film and perimeter adhesive layer.

In another embodiment, the perimeter pressure sensitive adhesive layer is utilized in combination with a self-wetting layer disposed upon the central region of the major surface of optical film. For example, with reference to FIG. 5, a cross-sectional view of an exemplary protection film 500 comprising optical film 510, a double-faced pressure sensitive adhesive tape comprising first pressure sensitive adhesive 525, tape backing 530 and second pressure sensitive adhesive 526 disposed at perimeter surface portions of the optical film 510 and a self-wetting optical layer 570 disposed on the same major surface of the optical film adjacent the perimeter pressure sensitive adhesive layer. The self-wetting layer and perimeter pressure sensitive adhesive layer typically have about the same thickness. In an alternative embodiment, a first pressure sensitive adhesive layer is utilized instead of a pressure sensitive tape. In this alternative embodiment (not shown), tape backing 530 and second pressure sensitive adhesive 526 are omitted and the thickness of first pressure sensitive adhesive layer 525 is about equal to the thickness of self-wetting layer 570.

Figure 5:
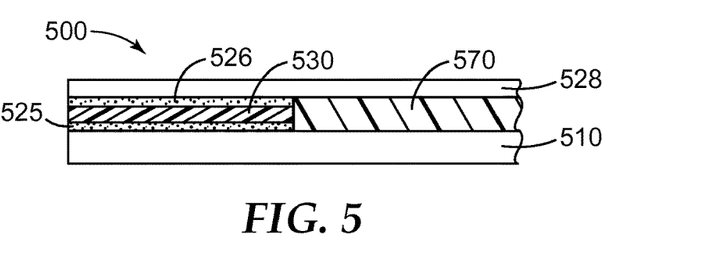
FIG. 5 is a schematic cross-sectional view of another embodied protection film comprising a pressure sensitive adhesive layer at perimeter surface portions of the optical film and a self-wetting layer at the central region.

In some embodiments, a double-faced pressure sensitive adhesive tape comprising first pressure sensitive adhesive 525 and second pressure sensitive adhesive 526 is utilized in combination with a self-wetting layer as depicted in FIG. 5. Alternatively, a double-face pressure sensitive adhesive tape can be utilized with the embodiments of FIGS. 1-4 wherein the protection film is free of pressure sensitive adhesive or a self-wetting layer at the central region. In yet another embodiment, a protection film kit is provided comprising an optical film and a double-faced pressure sensitive adhesive tape. The tape may be in the form of a single continuous strip or a plurality of strips. The width of the strips may correspond to the width of the perimeter adhesive layer. The tape is typically in the form of a double-faced pressure sensitive adhesive sheet when a self-wetting layer is also present.

In each of these embodiments, the double-faced pressure sensitive adhesive tape may have a backing (e.g. 530 of FIG. 5) or lack a backing. Further, the double-faced pressure sensitive adhesive tape may have a minimal thickness as previously described. In each of these embodiments, the first and second pressure sensitive adhesive of the double-faced tape may comprise the same adhesive composition or a different adhesive composition. In one embodiment, the first pressure sensitive adhesive (e.g. 525 of FIG. 5) aggressively adheres to the optical film (e.g. 510); exhibiting a 180 degree peel force to the (e.g. glass) display at a rate of 12 inches/minute as high as 500 g/inch, 1000 g/inch or 1500 g/inch; and the second pressure sensitive exhibits a 180 degree peel force to the (e.g. glass) display of 100 g/inch, 150 g/inch or 200 g/inch at a rate of 12 inches/minute.

The self-wetting layer is very soft and conformable, exhibiting (e.g. spontaneous) wet-out to surfaces with a very low lamination pressure. The wet out to the (e.g. glass) display surface is typically less than 5, 4, 3, 2, or 1 second as measured according to the wet out test method described in US 2011/0123800. In favored embodiments, the self-wetting layer exhibits a lower peel adhesion to the (e.g. glass) display than the perimeter pressure sensitive adhesive layer. In some embodiments, the peel adhesion of the self-wetting layer is at least 50%, 60%, 70%, 80%, or 90% lower than the peel adhesion of the perimeter pressures sensitive adhesive layer. In some embodiments, the 90 degree peel force to the (e.g. glass) display at a rate of 12 inches/minute is less than 150 g/inch or 100 g/inch or 75 g/inch or 50 g/inch. In some embodiment, the self-wetting exhibits a 90 degree peel force to the (e.g. glass) display at a rate of 12 inches/minute of at least 5, 10, 15 or 20 g/inch.

In some embodiments the self-wetting layer may be a gel-like elastomer having a high loading of plasticizer. In this embodiment, the self-wetting may not be considered a "pressure sensitive adhesive" in view of its extremely low peel force. When the self-wetting layer has an extremely low peel value, the self-wetting layer may have a relatively high coefficient of friction with the (e.g. glass) display such that the optical film is easily retained in contact with the viewing surface of the illuminated display device. Such high coefficient of friction or low peel adhesion is adequate to retain the optical film in place and preventing the film from moving when "swiping" or sliding one's finger across the protection film in contact with a touch display. Coefficient of static friction can be determined as described in PCT Publication No. WO2013/106241; incorporated herein by reference in its entirety. The height of the lifted edge, h, can be recorded and the coefficient of static friction, µ, was determined from the equation $$\mu = \frac{h}{\sqrt{L^2 - h^2}}.$$

In some embodiments, the coefficient of friction between the self-wetting layer and a surface treated (e.g. alkalialuminosilicate) glass (having a static contact angle with water of about 110 degrees using an inclined plane test) is at least 0.5, or 1, or 1.5 or 2.

In typical embodiments, the protection film is preassembled. The pressure sensitive adhesive layer at the perimeter surface portion has been applied to the major surface of the optical film and the opposing surface of the pressure sensitive adhesive is covered by a release liner. Alternatively, the protection film may be an unassembled kit. The kit comprises an optical film suitably sized for an illuminated display device and a double-faced tape comprising a pressure sensitive adhesive layer. The optical film and/or double-faced tape is characterized by any one or combination of the previously described features. Thus, in one embodiment, the kit comprises a curved optical film wherein opposing edges are spaced from a reference plane that is parallel to the major surface of the optical film by a distance of at least 1 mm. In another embodiment, pressure sensitive adhesive layer has a thickness no greater than 50 microns. In yet another embodiment, the double-faced tape is in the form of a sheet, the sheet comprising a pressure sensitive adhesive layer at the perimeter surface portions and a self-wetting layer having a lower average peel force than the pressure sensitive adhesive layer disposed upon the central region of the sheet.

A wide variety of pressure sensitive adhesive are suitable for the perimeter pressure sensitive layer as well as the self-wetting layer. In many embodiments, the adhesive is optically transparent (transmission of at least 95, 96, 97, 98, or 99% for visible light and L* no greater than 95 according to ASTM-E1164-07), particularly when disposed upon the central region of the protection film. Examples of suitable classes of pressure sensitive adhesives include those based on natural rubbers, synthetic rubbers, styrene block copolymers, polyvinyl ethers, acrylics, poly-α-olefins, silicones, urethanes or ureas.

As described in U.S. Provisional Application No. 61/831,761, filed Jun. 6, 2013, silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir et al.). One particularly suitable class of silicone pressure sensitive adhesives are the silicone polyoxamide-based pressure sensitive adhesives. These materials are described in, for example, U.S. Pat. No. 7,371,464 (Sherman et al.), U.S. Pat. No. 7,705,103 (Sherman et al.), and US Patent Publication No. 2007/0212535 (Sherman et al.).

Useful polyurethane and polyurea pressure sensitive adhesives include, for example, those described in WO 00/75210 (Kinning et al.), US Patent Publication No. 2012/0100326 (Sherman et al.) and in U.S. Pat. No. 3,718,712 (Tushaus); U.S. Pat. No. 3,437,622 (Dahl); and U.S. Pat. No. 5,591,820 (Kydonieus et al.).

In one embodiment, the polyurea pressure sensitive adhesive composition comprises a cured mixture comprising at least one X—B—X reactive oligomer, wherein X comprises an ethylenically unsaturated group, and B comprises a non-silicone segmented urea-based unit, as described in US Patent Publication No. 2011/0123800 (Sherman et al.); incorporated herein by reference. The non-silicone segmented urea-based unit typically comprises at least one urea group and at least one oxyalkylene group. Such compositions are particularly useful for the self-wetting layer.

Acrylic pressure sensitive adhesives generally have a glass transition temperature of about 20° C. or less, more typically 0° C. or less and may comprise from 100 to 80 weight percent of a $C_3$-$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Typically, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co.

One particularly suitable class of optically clear pressure sensitive adhesives are (meth)acrylate-based pressure sensitive adhesives and may comprise either an acidic or basic copolymer. In many embodiments the (meth)acrylate-based pressure sensitive adhesive is an acidic copolymer. Generally, as the proportion of acidic monomers used in preparing the acidic copolymer increases, cohesive strength of the resulting adhesive increases.

To achieve pressure sensitive adhesive characteristics, the corresponding copolymer can be tailored to have a resultant glass transition temperature (Tg) of less than about 20° C., more typically less than about 0° C. Particularly suitable pressure sensitive adhesive copolymers are (meth)acrylate copolymers. Such copolymers typically are derived from monomers comprising about 40% by weight to about 98% by weight, often at least 70% by weight, or at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0° C.

The acrylic pressure sensitive adhesive is derived from about 2% by weight to about 50% by weight, or about 5% by weight to about 30% by weight, of a copolymerizable basic monomer. Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinylpyrrolidone, N-vinylcaprolactam, acrylonitrile, N-vinylformamide, (meth)acrylamide, and mixtures thereof.

The acrylic pressure sensitive adhesive is derived from about 2% by weight to about 30% by weight, or about 2% by weight to about 15% by weight, of a copolymerizable acidic monomer. Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropane sulfonic acid, vinylphosphonic acid, and the like, and mixtures thereof. Due to their availability, typically ethylenically unsaturated carboxylic acids are used.

In certain embodiments, the acrylic pressure sensitive adhesive is derived from between about 1 and about 20 weight percent of acrylic acid and between about 99 and about 80 weight percent of at least one of isooctyl acrylate, 2-ethylhexyl acrylate or n-butyl acrylate composition. In some embodiments, the pressure sensitive adhesive is derived from between about 2 and about 10 weight percent acrylic acid and between about 90 and about 98 weight percent of at least one of isooctyl acrylate, 2-ethylhexyl acrylate or n-butyl acrylate composition.

Another useful class of optically clear (meth)acrylate-based pressure sensitive adhesives are those which are (meth)acrylic block copolymers. Such copolymers may contain only (meth)acrylate monomers or may contain other co-monomers such as styrenes. Examples of such pressure sensitive adhesives are described, for example in U.S. Pat. No. 7,255,920 (Everaerts et al.).

In some embodiments, it may be desirable for the adhesive layer to be a crosslinked pressure sensitive adhesive as taught in US Patent Publication No. 2007/0212535 (Sherman et al.). This is particularly useful for embodiments wherein the adhesive is microstructured by embossing. Embossing the surface of a crosslinked pressure sensitive adhesive to create a microstructured adhesive surface minimizes the formation of stresses within the adhesive after lamination because both the pre-structured and final states of the adhesive are substantially planar. Therefore, the structure is unstable when not in contact with the microstructured liner or molding tool. This is in contrast to microstructured adhesives produced by coating a flowable adhesive onto a microstructured release liner or a microstructured molding tool, where the initial state of the adhesive to which it tries to return is that of the microstructured configuration, while the final state is substantially planar.

The perimeter pressure sensitive adhesive and/or the self-wetting layer can optionally include various additives including fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 30% by weight. Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition. The self-wetting layer can optionally include these same additives to the extent that the presence thereof does not detract from the optical properties.

When the protection film exhibits curvature or further comprises a self-wetting layer disposed on the central region of the optical film adjacent the perimeter pressure sensitive adhesive, the perimeter pressure sensitive adhesive layer and self-wetting layer can be any suitable thickness. In general, the thickness of the adhesive layer and self-wetting layer ranges from 10 micrometers (about 0.4 mils) to 1500 micrometers (about 60 mils). More typically the adhesive is generally 25 micrometers (about 1 mil) to 51 micrometers (about 2 mils) thick. When the pressure sensitive adhesive layer or self-wetting layer is microstructured, the adhesive layer is typically thicker than the size (e.g. height) of the microstructures.

The pressure sensitive adhesive layer and/or self-wetting layer may be continuous or discontinuous. Discontinuous adhesive layers can have a variety of configurations, including random distributions or patterned distributions. Among suitable patterned distributions are stripes (either straight or wavy) and dots (in a variety of shapes and sizes). Additionally, the pressure sensitive adhesive layer and/or self-wetting layer, whether continuous or discontinuous, can be a segmented adhesive layer. A segmented adhesive layer is one that contains segments which contain different adhesive compositions. A segmented adhesive layer is different from an adhesive blend, in that in an adhesive blend a single adhesive composition comprises a mixture of different adhesive components. In a segmented adhesive layer, different segments of the adhesive layer comprise different compositions. The discontinuous adhesive layer or segmented adhesive layer can be prepared through the use of a variety of different coating techniques, for example, stripe coating or a variety of different printing techniques.

As illustrated for example in FIG. 5 perimeter pressure sensitive adhesive layer and the self-wetting layer of the protection film typically further include a removeable liner 528, often times referred to as a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. Typically, the liner has a thickness of from 25 micrometers (1 mil) to 127 micrometers (5 mils), more typically from 25 micrometers (1 mil) to 84 micrometers (3.3 mils).

In some embodiments, the liner is a separately formed article and in other articles the adhesive layer and liner, or even the substrate, adhesive layer, and liner are all generated simultaneously by coextrusion. In this process, separate molten polymeric streams are contacted to form the multi-layer article. Particularly suitable are the coextruded release liners described in US Patent Publication No. 2011/0316203 (Emslander et al.). In these liners, the release layer comprises a release agent. The release layer may also comprise other polymers, blended with the release agent. Typically, the release agent comprises copolymers of ethylene and alpha-olefins having from 3 to about 10 carbon atoms and density no greater than 0.91 g/cc. Suitable alpha-olefins include 1-butene, 1-hexene, 1-octene, and combinations thereof. Copolymers of ethylene and octene-1 are particularly suitable for use with acrylate-based pressure sensitive adhesives. The copolymers may be either block copolymers or non-block copolymers. In some embodiments, the copolymer has a density of no greater than 0.91 g/cc, for example, no greater than 0.89 g/cc. Suitable copolymers are commercially available from Dow Chemical Company, Midland, Mich., under the tradename "INFUSE" and from Exxon-Mobil Chemical Company, Houston, Tex., under the tradename "EXACT". In some embodiments, the copolymer is polyolefin polymer made using a metallocene catalyst.

The release agent may additionally be blended with other polymers to form the release layer. Examples of the polymers useful for blending with the release agent include other polyolefin polymers having a density of no greater than 0.91 g/cc: polyethylene (including low density polyethylene); polydiorganosiloxane polyoxamide copolymers; polypropylene; and those polymers sold under the trade names "NUCREL", "BASELL HL 456J", "VISTAMAX", "BYNEL"; and combinations thereof.

The perimeter pressure sensitive adhesive layer and/or self-wetting layer may be applied to the optical film utilizing various techniques including knife coating, roll coating, gravure coating, rod coating, curtain coating, and air knife coating. The adhesive may also be printed by known methods such as screen printing or inkjet printing. The coated solvent-based adhesive is then dried to remove the solvent. Typically, the coated solvent-based adhesive is subjected to elevated temperatures, such as those supplied by an oven, to expedite drying of the adhesive. The radiation curable pressure sensitive adhesives are then exposure to a source of actinic (e.g. ultraviolet) radiation.

In some embodiments, the perimeter pressure sensitive adhesive layer and/or self-wetting layer may be applied as a microstructured adhesive layer. Permanently structured adhesive surfaces are generally formed to control the adhesive properties of the adhesive layer, such as making the adhesive layer repositionable (as described, for example, in U.S. Pat. No. 6,315,651 (Mazurek et al.)) or to control the physical properties of the adhesive layer, such as for example to build in pillows of air to the adhesive layer to make the adhesive layer cushioning (as described, for example, in PCT Publication No. WO97/33946 (Hata)). It is more typical, however, for adhesive layers to have structured surfaces that are temporarily structured, meaning that the structures are designed to eventually disappear.

Figure 9:
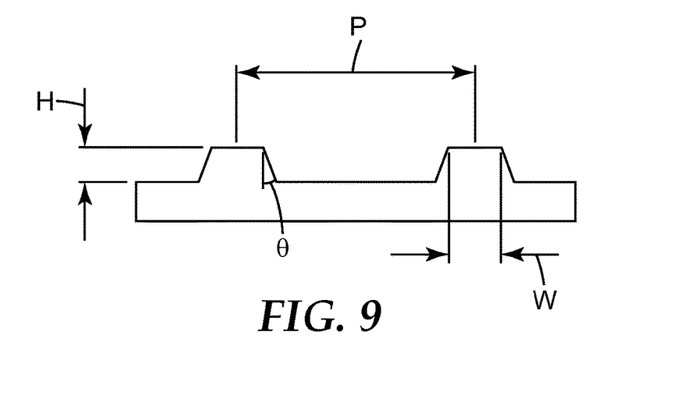
FIG. 9 is a cross-sectional view of an embossing tool for preparing a microstructured adhesive layer.

In one embodiment, the perimeter pressure sensitive adhesive layer and/or self-wetting layer is disposed on a liner containing a plurality of concave structures that correspond to a plurality of concave structures in the pressure sensitive adhesive layer, as described in U.S. Provisional Application No. 61/831,761, filed Jun. 6, 2013; incorporated herein by reference. In one embodiment, the microstructured adhesive is preferably prepared with a nickel plated copper tool roll with tooling shown in FIG. 9, wherein the height (H) of the structures is 50-500 micrometers (e.g. 203 micrometers (8 mils)); the width (W) of the structures is 25-200 micrometers (e.g. 102 micrometers (4 mils)); the pitch (P) of the structures, defined as the distance between the center of one structure and the center of its nearest neighbor, is 50-100 lines per inch (2.54 centimeters) (e.g. 70 lines per inch); and the (draft) angle $\theta$ is 5 to 20° (e.g. 10°).

In some embodiments, the "optical film" is light transmissive film in the optical path of the display that does not substantially alter at least one optical property as compared to viewing the display in the absence of the optical film. In this embodiment, the "optical film" is typically highly transparent, exhibiting a transmission of visible light (i.e. 400 to 700 nm) of at least 80%, 85%, or 90%. The transmission of an optical film can be measured with various known techniques. As used herein, the on-axis transmission was measured with an instrument commercially available from BYK Gardner under the trade designation "Haze-Guard Plus (catalog #4725)." A soil resistant film that typically comprises a low surface energy coating is an example of an optical film that does not substantially alter at least one optical property.

In favored embodiments, "optical film" refers to a light transmissive film in the optical path of the display that substantially alters at least one optical property as compared to viewing the display in the absence of the optical film. Examples of optical films include antiglare films, antireflective films, light-collimating films (also referred to as privacy filters), as well as certain films having a coating that reduces the visibility of fingerprints such as described in U.S. Publication No. 2012/0154811; incorporated herein by reference. Films that reduce the visibility of fingerprints exhibit a reduction in haze, a haze ratio of initial (simulated) fingerprint visibility to (simulated) fingerprint visibility at 20 minutes of less than 0.80, 0.70, 0.60, or 0.50.

Various antiglare films have been described in the art. As described at paragraph 0039 of US 2007/0286994, matte antireflective films typically have lower transmission and higher haze values than equivalent gloss films. For examples the haze is generally at least 5%, 6%, 7%, 8%, 9%, or 10% as measured according to ASTM D1003. Further gloss surfaces typically have a gloss of at least 130 as measured according to ASTM D 2457-03 at 60°; whereas matte surfaces have a gloss of less than 120.

There are several approaches for obtaining matte films. For example, matte coating can be prepared by adding matte particles, such as described in U.S. Pat. No. 6,778,240. In yet another approach, the surface of an antiglare film can be roughened or textured to provide a matte surface. According to U.S. Pat. No. 5,820,957; "the textured surface of the anti-reflective film may be imparted by any of numerous texturing materials, surfaces, or methods. Non-limiting examples of texturing materials or surfaces include: films or liners having a matte finish, microembossed films, a microreplicated tool containing a desirable texturing pattern or template, a sleeve or belt, rolls such as metal or rubber rolls, or rubber-coated rolls." In some embodiments, the antiglare film may have certain microstructure characteristics that can be obtained by microreplication, such as described in WO2010/141345; incorporated herein by reference.

Various antireflective films have also been described in the art. As used herein, antireflective film refers to a film that provides an average reflectance of no greater than about 2%, or 1.5%, or about 1% at 550 nm as measured with a spectrophotometer. Antireflective films generally comprise at least two layers having differing refractive indices. Some illustrated antireflective films are described in U.S. Patent Publication No. US2010/0232021 and WO2011/140018; incorporated herein by reference.

In some favored embodiments, the optical film of the electronic display device case is a light-collimating film, also referred to as a privacy filter or privacy film. Various light-collimating films are known. In some favored embodiments, light-collimating films typically include a light transmissive film having a plurality of parallel grooves wherein the grooves comprise a light-absorbing material forming louvers. See for example U.S. Pat. Nos. 4,621,898; 5,204,160; 6,398,370 and 8,012,567. Light-collimating films typically exhibit at least 60% transmission at a viewing angle of 0 degrees.

Light-collimating films can be placed proximate a display surface, image surface, or other surface to be viewed. At normal incidence, (i.e. 0 degree viewing angle) where a viewer is looking at an image through the light-collimating film in a direction that is perpendicular to the film surface, the image is viewable. As the viewing angle increases, the amount of light transmitted through the light-collimating film decreases until a maximum viewing angle is reached where substantially all the light is blocked by the light-absorbing material and the image is no longer viewable. This can provide privacy to a viewer by blocking observation by others that are outside a typical range of viewing angles.

Figure 6:
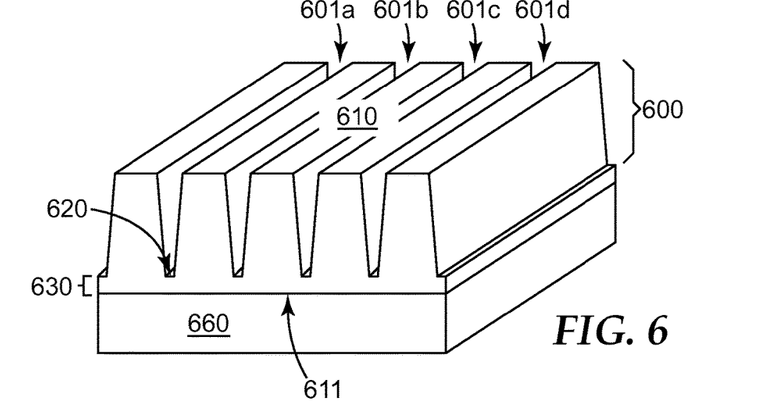
FIG. 6 is a perspective view of an exemplary microstructured article.

FIG. 6 shows an exemplary microstructured film article 600 comprising at least one microstructured surface 610. An embodied microstructured surface commonly employed for light-collimating films includes a plurality of grooves 601a-601b. As shown in FIG. 1, a continuous land layer 630 may be present between the base of the grooves 620 and the opposing (e.g. unstructured, substantially planar) surface 611 of the film 600. Alternatively, the grooves may extend all the way through the film. The microstructured article typically includes a base substrate layer 660. Examples of preferred base substrate layers include polyethylene terephthalate (PET) and polycarbonate. Examples of useful PET films include photograde polyethylene terephthalate and MELINEX™ PET available from DuPont Films of Wilmington, Del. Polycarbonate films are available from Sabic and Longhua (China).

Figure 7:
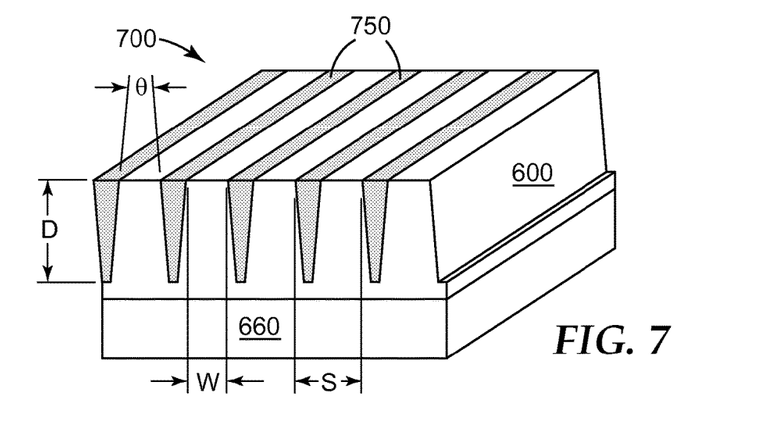
FIG. 7 is a perspective view of an exemplary light-collimating film.

FIG. 7 shows an embodied light-collimating film 700 wherein the grooves of FIG. 6 have been rendered light-absorbing by being filled with a light absorbing material 750. The light absorbing material in the shape of the recess of the (e.g. groove) microstructure is referred to herein as a light absorbing element.

Figure 8:
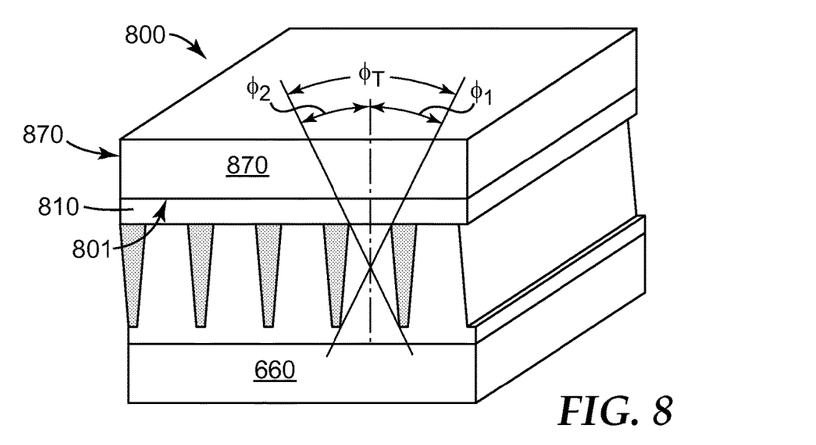
FIG. 8 is a perspective view of another exemplary light-collimating film.

FIG. 8 shows another embodied light-collimating film 800 that further includes a cover film 870 that is typically the same film as the base substrate layer 660 bonded to the microstructured surface with for example an (e.g. UV-curable acrylate) adhesive 810 disposed on interface 801.

As depicted in FIG. 7 or 8, the transparent microstructures between grooves have an included wall angle θ as depicted in FIG. 7, a maximum transparent microstructure width, W; an effective height D; center-to-center spacing, S; and a maximum viewing range $\Phi_T$. Wall angle θ is equal to 2 times the angle formed between the transparent film interface with the light absorbing element nearly along the "D" dimension direction and a plane normal to the microstructured surface. The viewing range $\Phi_T$ is about twice the maximum viewing half angle. The viewing range $\Phi_T$ can also be asymmetric for example when the half angle $\Phi_1$ is not equal to the half angle $\Phi_2$.

It is appreciated that transmission is a factor of the polymerizable resin of the light-collimating film as well as the included wall angle. In some embodiments, the transmission at an incident angle of 0° is at least 50%. The transmission at an incident angle of 0° can be at least 55%, 60%, 65%, 70%, or 75%).

Light-collimating films can be made that have relatively large included wall angles. Larger wall angles can increase the maximum width of the light absorbing regions, thereby decreasing the percent transmission at normal incidence.

In preferred embodiments, the included wall angle of the microstructures averages less than 6° and more preferably averages less than 5° (e.g. less than 4°, 3°, 2°, 1°, or 0°).

Smaller (i.e. steeper) wall angles are amenable to producing grooves having a relatively high aspect ratio (H/W) at a smaller center-to-center spacing S, thereby providing a sharper image viewability cutoff at lower viewing angles. In some embodiments, the transparent microstructures have an average height, H, and an average width at its widest portion, W, and H/W is at least 2.0, preferably 2.5, and more preferably 3.0 or greater.

Depending on the intended end use light collimating films having a variety of viewing cutoff angles can be prepared. In general, the viewing cutoff angle ranges from 40° to 90° or even higher. The following Table 1 provides exemplary viewing cutoff angles as a function of aspect ratio.

TABLE 1

| Aspect Ratio | View Angle (deg) |
|---|---|
| 1.50 | 120 |
| 1.75 | 100 |
| 2.0 | 90 |
| 3.0 | 60 |
| 4.0 | 48 |
| 5.0 | 40 |

For computer privacy films as well as hand-held devices, cutoff viewing angles are preferably 60° or less.

In some embodiments, the pitch is no greater than 0.040 mm, 0.039 mm. 0.038 mm, 0.037 mm, 0.036 mm or less. A smaller included wall angle and less pitch allows for higher performance with less height. In some embodiments, the height is no greater than 0.10 mm, or 0.090 mm, or 0.080 mm, or 0.070 mm. Light-collimating films having such reduced height are further described in WO2010/148082; incorporated herein by reference. Less height results in less overall thickness of the film. Thinner films tend to have better touch sensitivity.

Light absorbing materials useful for forming light absorbing regions in light collimating films of the present invention can be any suitable material that functions to absorb or block light at least in a portion of the visible spectrum. Preferably, the light absorbing material can be coated or otherwise provided in grooves or indentations in a light transmissive film to form light absorbing regions in the light transmissive film. Exemplary light absorbing materials include a black or other light absorbing colorant (such as carbon black or another pigment or dye, or combinations thereof) dispersed in a suitable binder. Other light absorbing materials can include particles or other scattering elements that can function to block light from being transmitted through the light absorbing regions.

The light absorbing material may comprise substantially the same polymerizable resin composition as the film with the exception of the inclusion of pigment or dye. The amount of (e.g. carbon black) colorant is typically at least about 2 wt-% and no greater than about 10 wt-%. One exemplary light absorbing composition is described in Example 3 of U.S. Pat. No. 6,398,370.

To reduce reflections at the light transmissive film/light absorbing material interface, it may be desirable to match or nearly match the index of refraction of the transmissive film material with the index of refraction of the light absorbing material over all or a portion of the visible spectrum. Reducing such reflections tends to reduce the formation of ghost images.

Although the inclusion of a plurality of parallel light absorbing grooves is most common, the light-collimating film may alternatively include a plurality of light absorbing columns such as shown in FIG. 2b of U.S. Pat. No. 6,398, 370; incorporated herein by reference. In addition, the light-collimating film described herein may be combined with a second light-collimating film, as also described in U.S. Pat. No. 6,398,370.

Light-collimating films are commercially available from 3M and are also distributed by Elecom of Japan. Light-collimating films commercially available for use with notebook computers typically comprise tabs on the periphery of the film that are intended to fit between the peripheral housing of the illuminated display and the display surface to hold the film in contact with and in a plane parallel to the illuminated display.

Another type of optical film that can provide some degree of privacy are multi-layer (e.g. color shifting) films such as described in US 2010/0201242.

In some embodiments, a single optical film may (e.g. concurrently) alter more than one optical property. For example, some antireflective films are also antiglare.

The invention is further described with reference to the following non-limiting examples.

EXAMPLES

Test Method
Curvature Measurement

Film curvature was measured as follows. A 7.6 cm×12.7 cm (3 inch×5 inch) rectangular sample was prepared and placed on a flat metal surface that provides a reference plane. The center portion of the optical film lies flush with the reference plane. The film is place on the metal surface such that opposing edges of the film curve away from the metal surface creating an air gap between the opposing edges and the metal surface. The distance between the metal surface and the bottom of the sample at each of the outermost edges of each of the four corners was then measured to the nearest millimeter and averaged.

Polymershapes, Seattle Wash. under the trade designation "Lexan") to the louver film, a nip-roller lamination process was used with a tension differential between the polycarbonate cover sheet and the louver film of about 480 kPa (70 psi) created by increasing the tension on the louver film and decreasing the tension on the polycarbonate cover sheet. This tension differential caused curve to be induced in the light collimating film away from the polycarbonate cover sheet side.

The curvature of the light collimating optical film was measured as previously described (i.e. using a 3 inch×5 inch film sample). The curvature averaged about 2.25 mm.

A double coated tape was prepared by coating a 1.9 cm (¾ inch) wide MELINEX 427 PET film substrate with a 25 micron (1 mil) Low Tack PSA on one side and 25 micron (1 mil) high tack lamination adhesive (8171 CL) on the other side. The tape was attached to the perimeter of the light collimating film sized 23.7×18.2 cm with the high tack side of the tape facing the polycarbonate cover sheet side of the light collimating film.

Curvature was also measured on the protection film samples that had double coated tape around the border. The curvature averaged about 5 mm.

The protection film was attached to a tablet computer commercially available from Apple under the trade designation iPad® and the attached film was inspected. The central region of the protection film was touched to see if there was any change in reflection due to any deflection or

| Materials | | |
|---|---|---|
| Trade Designation or Abbreviation | Material | Supplier |
| MELINEX 427 | 100 micron (4 mil) thick polyethylene terephthalate film | MELINEX 427, available from Dupont Tejin Films, Chester VA |
| 3M ™ Optically Clear Adhesive 8171 CL | Acrylic adhesive having a thickness of 25 microns disposed between a pair of 50 microns polyester release liners | 3M Company, St. Paul, MN |
| Low Tack PSA | Low tack pressure sensitive adhesive | Prepared as described in Example 11 of PCT Publication WO 2009/085662 (Sherman et al.) |
| ACEMATT OK 412 | Wax treated precipitated silica | Evonik Industries AG, Essen, Germany |
| IRGACURE 819 | Curing agent | Ciba Specialty Chemicals, Basel, Switzerland |
| SR238 | 1,6 hexanediol diacrylate | Sartomer Company, Exton, PA |
| SR295 | Pentaerythritol tetraacrylate | Sartomer Company, Exton, PA |

The "3M™ Optically Clear Adhesive 8171 CL" is reported to have an initial peel adhesion to glass of 50 oz/inch (1429 g/inch) according to ASTMD3330 modified, 180 degree peel, 12 inches/min (305 mm/min) Example 11 of PCT Publication WO 2009/085662 (Sherman et al.) is reported to have a 90 degree peel to glass at peel rate of 12 inches/min of 8.4 oz/inch (240 g/inch) for a 50 micron adhesive thickness. For a 25 micron adhesive thickness the 90 degree peel would typically be no greater than about 120 g/inch.

Example 1

Protection Film with Curve Induced by Tension Differential

A light collimating film was prepared as described in Example 4 of US Patent Publication 2010/0214506 (Gaides et al.) except that the during lamination of the 0.007 inch (0.178 mm) polycarbonate cover sheet (available from GE depression of the film. No change in reflection was observed. The central region of the protective film was also compared to a control protective film wherein the control protective film purposefully provided an air gap between the optical film and the touch screen device. The central region of the protection film of Example 1 did not have a "spongy feel" as was evident with the control protection film.

Comparative Example C1

A commercially available screen protector, designed for an iPad®, was obtained and the curvature was measured as described in the section entitled "Curvature Measurement". The measured curve was 0 mm at all corners. Such screen protector has a perimeter pressure sensitive adhesive frame having a thickness of 65 microns. The perimeter pressure sensitive adhesive frame has a width of 1.5 cm along the length and a width of 1.8 cm along the width.

Examples 2-7

Protection Film with Curvature Induced by a Coating with Shrinkage

A coated film substrate was prepared as in Example 36 of US Patent Publication No. 2012/0154811 (Pokorny et al.). (55% SR444)

The hardcoated article was prepared by coating hardcoat formulations on the uncoated side of the film substrate as described below. The hardcoat was applied using a wire wound bar (R.D.S., Webster, N.Y.). The coated film was cured using a high-pressure mercury lamp (H type) manufactured by Fusion UV Systems, Inc. (Gaithersburg, Md.) with ultraviolet (UV) radiation under conditions of 6 m/min (20 ft/min) and 100% power to give a cured hardcoat on the film. Hardcoat formulations were prepared by combining 100.0 parts of a 1:1 mixture (by weight) of SR238 and SR295, 1.0 parts IRGACURE 819 and ACEMATT OK 412 in the amount indicated in the table below. The components were thoroughly admixed and heated until all components were in solution.

The curve was measured as described in the section entitled "Curvature Measurement". The curve averaged over all four corners is reported in the table below.

| Example | ACEMATT OK 412 (parts) | Wire Wound Bar # | Average Curve (mm) |
|---|---|---|---|
| 2 | 0 | 3 | 3.75 |
| 3 | 1.33 | 3 | 6.25 |
| 4 | 1.33 | 6 | 3.25 |
| 5 | 4 | 3 | 5.25 |
| 6 | 4 | 6 | 3 |
| 7 | 12 | 3 | 5.5 |

Example 8

Protection Film with Thin Perimeter Adhesive

A light collimating film was prepared as described in Example 1 except that during lamination the tension differential between the polycarbonate cover sheet and the louver film was about 210 kPa (30 psi) resulting in a flat film. The light collimating film was cut to fit an iPad®.

8171 CL was used a transfer tape. The transfer tape was cut into 1.9 cm (¾ inch) strips. One of the PET liners was removed from each strip and the strips were adhered to the perimeter of the polycarbonate cover sheet side of the light collimating film. The remaining 50 micron thick liners were then removed and the light collimating film was attached to an iPad®. At least a center portion of the film contacted the touch screen of the iPad®.

Example 9

Protection Film with Perimeter Adhesive and Self-Wetting Layer 1.9 cm (¾ inch) wide strips of 8171 CL were attached to the polycarbonate cover sheet side of the perimeter of a light collimating film prepared as in Example 8. An uncured pressure sensitive adhesive as described in Example 11 of PCT Publication WO 2009/085662 (Sherman et al.) was utilized as the self-wetting layer in the center region of the light collimating film adjacent the perimeter strips. The uncured pressure sensitive adhesive was coated using a knife coater and then cured under high intensity UV exposure using a Fusion UV lamp from Fusion UV Systems, Inc. (Gaithersburg, Md.) with an output of 236 W/cm (600 W/inch) and with a belt speed of 6 m/min (20 ft/min). The thickness of the cured self-wetting layer in the center region was about 25 microns (1 mil).

What is claimed is:

1. A protection film comprising:
   an optical film suitably sized for an illuminated display device, the optical film having a major surface comprising perimeter surface portions defining a central region; and
   a pressure sensitive adhesive layer disposed at perimeter surface portions such that the central region is free of pressure sensitive adhesive;
   wherein the protection film is curved such that opposing edges that define the thickness of the protection film are spaced above a reference plane by a distance of at least 1 mm when the protection film is placed on the reference plane such that the central region is flush with the reference plane;
   wherein the protection film is curved by at least one of (1) the optical film having a tension differential between at least two layers, (2) the optical film including a heat shrinkable film, (3) the optical film including a coating composition having sufficient shrinkage to induce curvature, or (4) the protection film having rolled been upon itself forming a hollow tube.

2. The protection film of claim 1 further comprising a release liner disposed on the pressure sensitive adhesive layer and the protection film is curved after the release liner is removed.

3. The protection film of claim 2 wherein the protection film is not curved prior to the release liner being removed.

4. The protection film of claim 1 wherein the opposing edges are parallel to the longest dimension of the major surface the protection film.

5. The protection film of claim 1 wherein the opposing edges are parallel to the shortest dimension of the major surface of the protection film.

6. The protection film of claim 1 wherein the protection film is rectangular having corners and the outermost edge of each corner is spaced from the reference plane by a distance of at least 1 mm.

7. The protection film of claim 1 wherein the opposing edges spaced from the reference plane by a distance up to 10% of a maximum dimension of the protection film.

8. The protection film of claim 1 wherein the optical film or protection film has a tension different between at least two layers to induce curvature.

9. The protection film of claim 1 wherein the optical film comprises a coating composition on at least a portion of at least one major surface and the coating composition has sufficient shrinkage to induce curvature.

10. The protection film of claim 1 wherein the protection film is provided in a form wherein the protection film is rolled upon itself forming a hollow tube to induce curvature.

* * * * *